(12) United States Patent
Awano

(10) Patent No.: US 6,196,465 B1
(45) Date of Patent: *Mar. 6, 2001

(54) CAPACITIVE DATA CARD AND READER THEREOF

(75) Inventor: Kouichi Awano, Tokyo (JP)

(73) Assignee: Tokyo Mechatoronics Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,446

(22) PCT Filed: Jan. 31, 1997

(86) PCT No.: PCT/JP97/00249

§ 371 Date: Jul. 31, 1998

§ 102(e) Date: Jul. 31, 1998

(87) PCT Pub. No.: WO97/28515

PCT Pub. Date: Aug. 7, 1997

(30) Foreign Application Priority Data

| Feb. 2, 1996 | (JP) | ................................................. 8-039120 |
| May 20, 1996 | (JP) | ................................................. 8-147862 |
| Jul. 15, 1996 | (JP) | ................................................. 8-202749 |
| Sep. 25, 1996 | (JP) | ................................................. 8-272877 |

(51) Int. Cl.$^7$ .................................................. G06K 19/00
(52) U.S. Cl. ......................... 235/487; 235/492; 235/493
(58) Field of Search .............................. 235/487, 492, 235/493, 449, 451; 902/25, 26, 27

(56) References Cited

U.S. PATENT DOCUMENTS

| 3,699,311 | * | 10/1972 | Dunbar | ................................. 235/451 |
| 5,055,662 | * | 10/1991 | Hasegawa | ............................ 235/492 |
| 5,471,039 | * | 11/1995 | Irwin, Jr. et al. | ................ 235/451 X |
| 5,471,040 | * | 11/1995 | May | .................................... 235/451 |
| 5,471,044 | * | 11/1995 | Hotta et al. | ........................... 235/487 |
| 5,594,233 | * | 1/1997 | Kenneth et al. | ..................... 235/492 |
| 5,606,158 | * | 2/1997 | Takemoto et al. | ............... 235/487 X |
| 5,880,445 | * | 3/1999 | Mori et al. | ....................... 235/493 X |
| 5,949,060 | * | 9/1999 | Schattschneider et al. | ......... 235/492 |

FOREIGN PATENT DOCUMENTS

| 3-126184 | 5/1991 | (JP) . |
| 5-233902 | 9/1993 | (JP) . |
| 6-187521 | 7/1994 | (JP) . |
| 7-200761 | 8/1995 | (JP) . |

\* cited by examiner

*Primary Examiner*—Michael G Lee
*Assistant Examiner*—Jared J. Fureman
(74) *Attorney, Agent, or Firm*—Armstrong, Westerman, Hattori, McLeland & Naughton, LLP

(57) ABSTRACT

The present invention relates to an improvement of a capacitive data card in which a fuse is built in a circuit of the card and a data bit is represented by a state of the fuse and to a reader of the capacitive data card. An object of the present invention is to provide a capacitive data card having high utility value and high reliability and a reader thereof. The capacitive data card comprises a capacitive memory area for storing bits relative to capacitive data in accordance with a resistance state of a fuse which is built in a circuit of the card, that is, a state for flowing an electric current through the circuit is set when the fuse is intact, and resistance of the circuit is substantially increased when the fuse blows out, and a magnetic memory area for storing magnetic data.

7 Claims, 7 Drawing Sheets

CAPACITIVE DATA CARD AND READER THEREOF

TECHNICAL FIELD

The present invention relates to an improvement of a capacitive data card in which a fuse is built in a circuit thereof and a bit of data is represented by a state of the fuse, and also relates to a reader of the capacitive data card.

TECHNICAL BACKGROUND

It is convenient for a user to use a data card (hereafter, refer to a prepaid card) in which no change in payment is required in many application examples such as a public telephone, a parking meter, an automatic vending machine and traffic facilities. No cash is used in a device receiving the card so that damages such as destruction for the purpose of a theft, etc. are avoided. Therefore, there are advantages of lengthening a device life, etc.

Among such prepaid cards, a capacitive data card constituting one portion of a circuit having a capacitor comes to public notice as a data card with low price and low energy. A prepaid card system of this capacitive type is already registered as U.S. Pat. No. 4,280,119 on Jul. 21, 1981.

International Application WO95/14285 of May 26, 1995 discloses a prepaid card system with a fuse built in a circuit of the capacitive data card. When this fuse is intact, the fuse is in a state in which an electric current flows through this fuse. When the fuse blows out, resistance of the circuit is substantially increased. Therefore, a bit of data is represented by a resistance state of the fuse.

As shown in FIG. 14, this capacitive data card can form a circuit 3 having capacitors only when a card section 1 is integrated with a sensor section 2 formed on a reader side.

This card section 1 has a resistor R1 and electrode portions 1a, 1b each forming one portion of a capacitor connected to each terminal of this resistor R1. A sensor section 2 has electrode portions 2a, 2b each forming one portion of the capacitor connected to each terminal of a power source 4. When the card section 1 is set to the sensor section 2, a circuit having air capacitors 3a, 3b having air between the electrode portions is formed as shown in FIG. 14.

When the resister R1 in the circuit 3 formed as mentioned above is burned out by flowing an electric current having a high voltage through the resistor R1, the resistor R1 is used up and a state of the resistor R1 which is not burned out represents an unused bit so that one closed circuit provides a signal of one bit. Therefore, it is possible to form a data card in which a signal having a required digit number can be stored by forming an arbitrary number of closed circuits.

However, in the above conventional capacitive data card, bits are changed from an unused state to a used state by burning out the resistor R1 so that data cannot be easily regenerated. Accordingly, since data are not easily regenerated, alteration of the data is prevented and the capacitive data card has high reliability as merits. However, a constant limit is imposed on update of data stored in the card so that a problem exists in that utility value of the card cannot be sufficiently fulfilled.

In consideration of such a situation, the present invention provides a capacitive data card with high utility value and high reliability, and also provides a reader of this capacitive data card.

DISCLOSURE OF THE INVENTION

To achieve the above object, a capacitive data card comprises a capacitive memory area for storing bits relative to capacitive data in accordance with a resistance state of a fuse which is built in a circuit of the card, that is, a state for flowing an electric current through the circuit is set when the fuse is intact, and resistance of the circuit is substantially increased when the fuse blows out, and a magnetic memory area for storing magnetic data.

Further, the above mentioned capacitive memory area comprises a rough estimate remaining means which shows a rough estimate of the remaining amount of compensation recorded in the card by a bit.

A capacitive data card is also provided which comprises a capacitive memory area for storing capacitive data and a magnetic memory area for storing magnetic data, and a layer constituting the magnetic memory area is provided on the surface of a substrate having the shape of a thin plate, and a layer constituting the capacitive memory area is superposed on a surface of the layer constituting the magnetic memory area.

A capacitive data card is also provided which comprises a capacitive memory area for storing capacitive data, and a magnetic memory area for storing magnetic data, and a layer constituting the capacitive memory area is formed on one side of a substrate having the shape of a thin plate, and a layer constituting the magnetic memory area is formed on the other side of the substrate. In this case, according to claim 4, a coating layer in the shape of a thin film which is made of a polyethylene film, etc. is desirably superposed on both of the surface of the capacitive memory area layer and the magnetic memory area layer to prevent warp of the substrate.

A capacitive data card is also provided which may have a construction in which data stored in the magnetic memory area are stored into a well-known IC chip.

On the other hand, a capacitive data card reader is also provided which comprises a first input output means for storing data in the capacitive memory area of the capacitive data card or reading the data stored therein, a second input output means for storing data to the magnetic memory area or reading the data stored therein, and a checking means for judging that the card is invalid irrespective of the data stored in the magnetic memory area when data read from the capacitive memory area are predetermined data.

BEST FORMS FOR EMBODYING THE INVENTION

First Embodiment

The embodiments of the present invention will be now explained with reference to the drawings.

Figure 1:
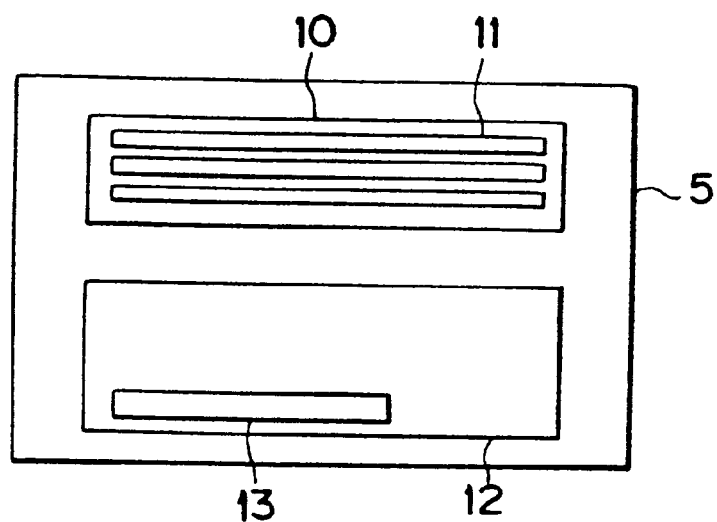
FIG. 1 is a view showing a capacitive data card in accordance with a first embodiment of the present invention.

FIG. 1 shows a capacitive data card 5 in accordance with a first embodiment of the present invention. This card 5 has a capacitive memory area 12 relative to storage of capacitive data and a magnetic memory area 10 relative to storage of magnetic data, and is normally used as a "prepaid card".

Magnetic tracks 11 are formed in the above magnetic memory area 10 in reading and writing directions of the card 5. Although, the number of magnetic tracks 11 is set to three in this embodiment, it is not limited to three and many vary according to a memory amount depending on a use purpose of the card 5.

Data are stored in the above tracks 11 in an information character order. A cyclic redundancy check code (CRC code) for a reading check is formed in recorded effective data. For example, magnetic characteristics and an information recording format in the magnetic memory area 10 may be based on Japanese Industrial Standard (JIS).

Figure 2:
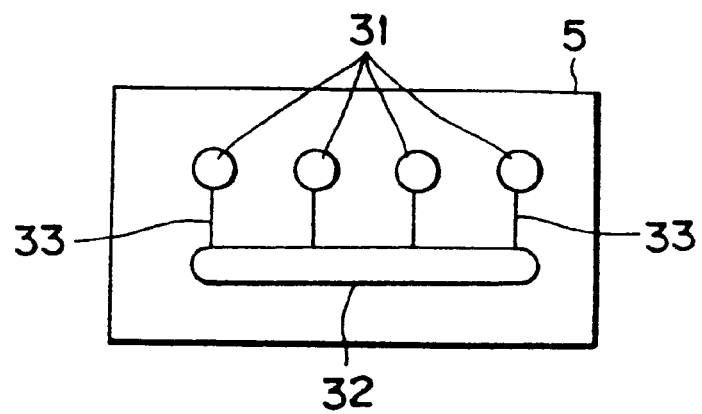
FIG. 2 is a block diagram showing the circuit construction of a capacitive memory area in accordance with this embodiment.

In regard to the above capacitive memory area 12, a plurality of first electrodes 31 are arranged in one line on one surface of the card 5 and second electrodes 32 formed in a strip shape are arranged on the other surface of the card 5 in a parallel position to the first electrodes 31 as shown in FIG. 2, such that this arrangement is in conformity with an electrode arrangement of an input output section 6 (see FIG. 3 and FIG. 4) described later. An elongated second electrode 32 is arranged on the surface of the capacitive memory area 12 in parallel with the line of the first electrodes 31.

Each of the first electrodes 31 is connected to the second electrode 32 through a fuse 33. When this fuse 33 is intact, an electric current freely flows between each of the first electrodes 31 and the second electrode 32, and a very small resistance state is set. When the fuse 33 is burned out, an increase in resistance sufficient to reduce the flow of the electric current is caused.

Generally, card information recorded on the "prepaid card" has two types of information, i.e., fixing information not rewritten and variable information rewritten in a card use, etc.

The above fixing information includes "card issuer number", "card issuing date", "nominal value of card", "the term of validity of card", "card usable data (a code written to show that the card is usable at the time of issuing card)", "password number (a number for recognizing by the system that a card user is the registered person)", and the like. The variable information includes "the card previous balance (the balance before settlement of accounts)", "the card new balance (the balance after settlement of accounts)", "used device number (device number of settlement of accounts)", "used store (store number of settlement of accounts)", and the like. For example, in the case of an amount of money, the card balance is shown by frequency such as a telephone card depending on a use purpose of the card.

In this embodiment, the above fixing information is recorded on both the magnetic memory area 10 and the capacitive memory area 12. Further, a rough estimate remaining memory section 13 showing a rough estimate of the remaining amount of card compensation is provided in the capacitive memory area 12.

In one example of using this rough estimate remaining memory section 13, for example, when the nominal value of the prepaid card is one thousand yen, 10 fuses (10 bits) relative to capacitive data are secured and are sequentially blown out (burned out) in a predetermined unit in accordance with a reduction in the balance at the time of using the card 5. In a state in which all the fuses 33 blow out, the balance is set to zero and value of the card 5 is lost.

When the fuses are burned out, a boundary area around the fuses is heated so that the rough estimate balance can be visually confirmed by applying a material having a color changing property by heat in a corresponding portion.

The above variable information is recorded on the above magnetic memory area 10 in addition to the above fixing information. Among the variable information, the "card new balance (balance after settlement of accounts)" is particularly important which shows the value of the card 5. Therefore, in this embodiment, this "card new balance" and the "rough estimate balance" of the above rough estimate remaining memory section 13 are updated in association with each other.

For example, the card new balance is updated in the same one-yen unit as an adjusted amount at every use of the card 5. On the other hand, with respect to the rough estimate remaining memory section 13, the fuses blow out in one hundred yen unit and the rough estimate balance decreases in amount. In this case, for example, if an amount of money equal to larger than the card new balance is stored as the rough estimate balance, it is possible to check the prepaid card as invalid when the card new balance is larger than the rough estimate balance, or when the rough estimate balance is zero but the card new balance is left.

It is not necessary to update the rough estimate balance by the unit of constant amount of money. If a unit of the "updated amount of money" is set to be smaller as the balance is reduced, it is convenient for a demander to visually confirm the above rough estimate balance.

In addition to the fixing information and the variable information described above, for example, various kinds of information depending on a use purpose such as information of a passenger interval of traffic facilities, a utilizing interval of a superhighway, etc. can be recorded on the magnetic memory area 10.

Figure 3:
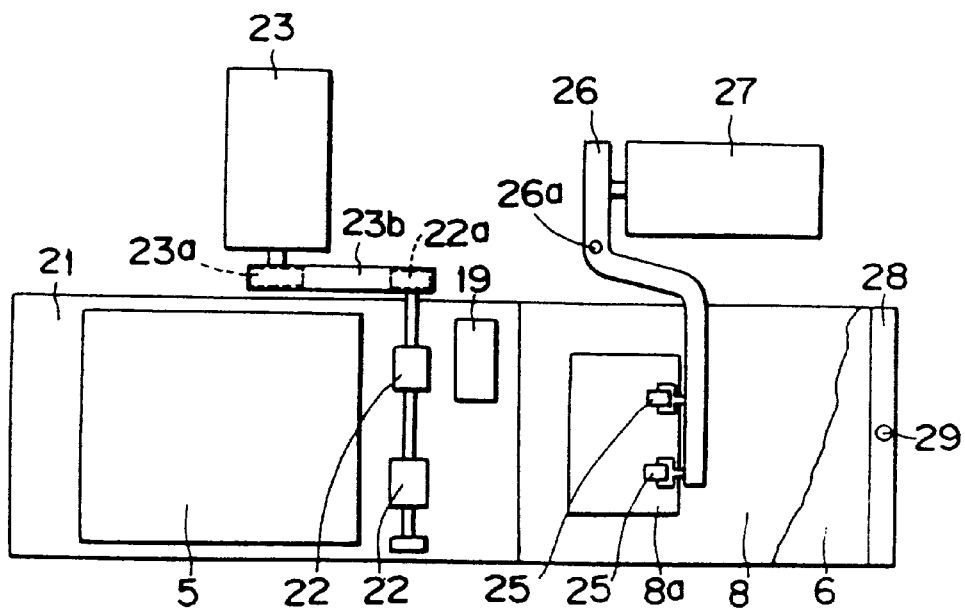
FIG. 3 is a view showing an input output section of a capacitive data card reader in accordance with this embodiment.

Next, the reader of the above card 5 will be explained. As shown in FIG. 3, the input output section of the reader of this card 5 comprises a card feed base 21, feed rollers 22, a card taking-in motor 23, a magnetic head 19, a cushion rubber case 8, a taper plate 8a, a lever 26, a solenoid 27, and an edging sensor 28 or an optical sensor 29. The card feed base 21 puts the card 5 thereon and feeds the card 5 until a position capable of performing reading and writing operations. The feed rollers 22 are arranged as a feed device for moving the card 5 until the position capable of performing the reading and writing operations by applying moving force to the card 5 above this card feed base 21. The card taking-in motor 23 supplies rotating power for rotating these feed rollers 22. The magnetic head 19 performs the reading and writing operations of magnetic data with respect to the magnetic memory area 10. The cushion rubber case 8 is arranged just above the input output section 6 arranged at a terminal end of the card feed base 21 and functions as a pressing member for pressing the card 5. The taper plate 8a is arranged as a pressing direction converting member of a pressing means arranged on an upper face of this cushion rubber case 8. The lever 26 is arranged as an arm portion of the pressing means to which rollers 25, 25 for pressing this taper plate 8a from above are attached. The solenoid 27 is arranged as an operating portion of the pressing means for operating this lever 26. The edging sensor 28 or the optical sensor 29 is arranged as a detecting means for detecting that the card reaches an end edge portion of the input output section 6.

Figure 4:
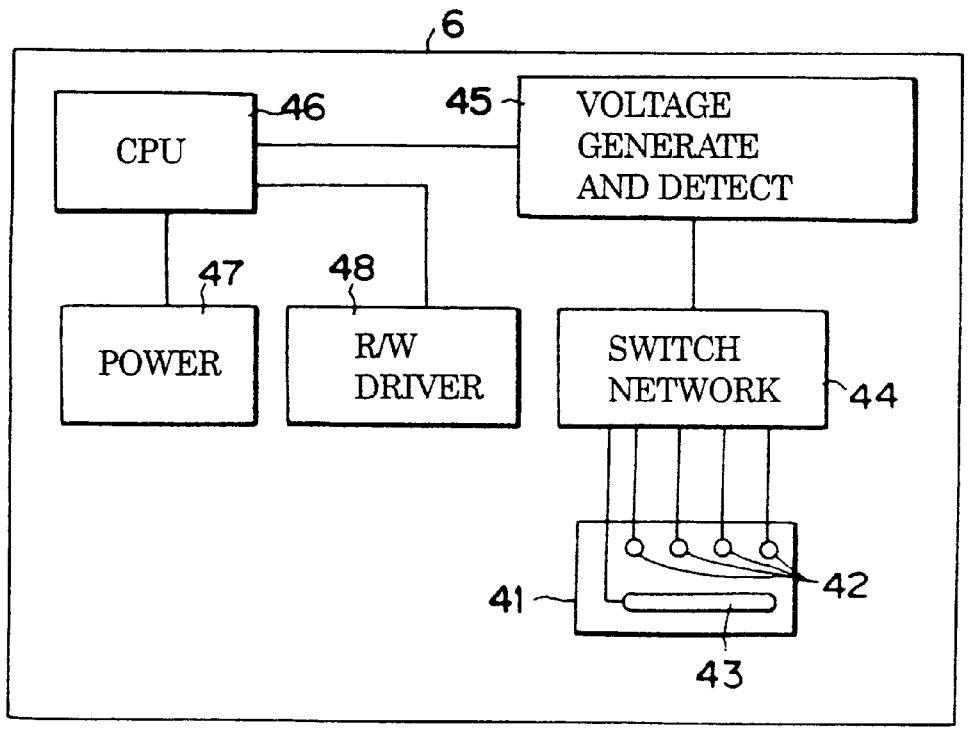
FIG. 4 is a block diagram showing the construction of a processing section relative to an input and an output of the capacitive data card reader in accordance with this embodiment.

As shown in FIG. 4, an interface pad 41 is arranged in the above input output section 6 in a card inserting position. On this interface pad 41, first electrodes 42 are arranged in one line and the number of first electrodes 42 is set to be equal to the number of first electrodes 31 of the above card 5. Further, similar to the second electrode 32 of the above card 5, a second electrode 43 is formed in an elongated shape. The electrodes 42 and 43 are arranged on a pad surface in positions corresponding to the respective electrodes 31 and 32 such that the electrodes 42 and the electrodes 43 can be respectively connected to the first electrodes 31 and the second electrode 32 of the card 5.

The first electrodes 42 and the second electrode 43 are respectively connected in parallel to a switch network 44. This switch network 44 selectively switches supply destinations of an analog voltage to be supplied and supplies a required voltage to selected one of the electrodes 42 or the electrode 43.

Further, a voltage generator 45 and a power source 47 are arranged in the above input output section 6 in addition to the first electrodes 42, the second electrode 43 and the switch network 44. The voltage generator 45 supplies the required voltage to each of the first electrodes 42 or the second electrode 43 through this switch network 44, and detects an output voltage. The power source 47 supplies a required voltage to each device of the input output section 6 and a read write driver 48 for controlling an operation of the magnetic head 19.

Figure 5:
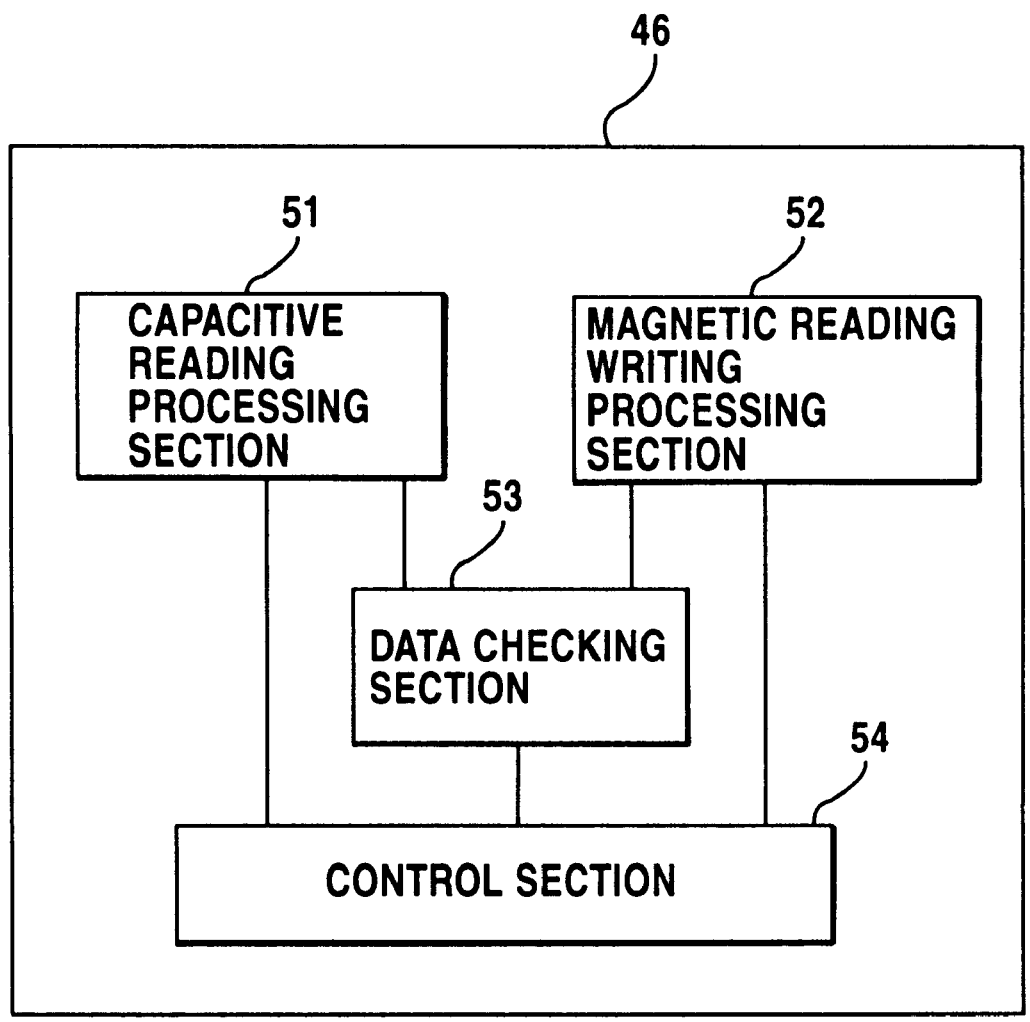
FIG. 5 is a block diagram showing processing of a CPU.

The operation of the input output section 6 having the above construction is controlled by a CPU 46. As shown in FIG. 5, this CPU 46 has a capacitive reading processing section 51 for controlling reading and writing operations of capacitive data, a magnetic reading writing processing section 52 for controlling reading and writing operations of magnetic data, a data checking section 53 for checking data contents, etc., and a control section 54 for generally controlling operations of these sections.

An operation of the above reader will next be explained. When a card 5 is inserted into the input output section 6 from the card feed base 21, the rollers 22, 22 rotated by the card taking-in motor 23 give moving force to the card 5 from its rear face so that the card passes through the magnetic head 19. In this case, this magnetic head 19 reads magnetic data from a track 11 of the card. These magnetic data are transmitted to the magnetic reading processing section 52 through the read write driver 49. Subsequently, when the above card 5 is fed and reaches the input output section 6, the edging sensor 28 or the optical sensor 29 detects that the card a is inserted in a predetermined position. Thus, the solenoid 27 is turned on. When the solenoid 27 is turned on, this solenoid 27 moves the lever 26 in an operating direction thereof so that the lever 26 is rotated around a pin 26a as a center. Thus, the rollers 25, 25 are rotated so that the taper plate 8a is moved in an increasing direction in height. While a taper face is pressed, the cushion rubber case 8 is pressed downward and uniform pressing force is applied to the card 5 through the cushion rubber.

When it is detected that the card 5 has thus reached The input output section 6 and the card 5 is inserted in a predetermined position, a signal is outputted to the switch network 44 and the CPU 46 and it is informed that readable and writable states are set. Thus, a closed circuit having air capacitors is formed between the card 5 and the input output section 6, and the reading and writing operations of data can be executed by the input output section 6.

At the time of reading the above data, a signal is outputted to a pair of first electrodes 42, 42 connected to the above second electrode 43 on the basis of a reading control signal from the capacitive reading processing section 51 so that "an electrode through which an electric current flows" is designated. The electric current then flows through this electrode and information of a bit thereof is read. This procedure is repeated and all second electrodes 43 and all pairs of first electrodes 42, 42 connected to these second electrodes 43 are designated and an electric current flows through these electrodes so that all registered contents of the card 5 are read.

When the reading operation of the card 5 is terminated, the data checking section 53 checks in the following procedures whether the data contents are right.

First, it is confirmed whether all bit data in the rough estimate remaining memory section 13 show zero (showing that fuses are melted and cut). When all the bit data show zero, it is judged that value of the card 5 is vanished. Accordingly, measures for collecting the card 5, etc. are taken by an unillustrated collecting mechanism. In this case, contents of the "card new balance" stored in the magnetic memory area 10 are neglected as invalid data.

The "card new balance" of the magnetic memory area 10 and the "rough estimate balance" in the rough estimate remaining memory section 13 are also compared with each other. When the "card new balance" is larger than the "rough estimate balance", this card is judged as an invalid card and measures for collecting this card, etc. are taken. In this case, as mentioned above, it is set as a premise that the card is managed such that the "rough estimate balance" is equal to or greater than the "card new balance" at any time.

Further, if necessary, fixing information stored in the magnetic memory area 10 and fixing information stored in the capacitive memory area 12 and corresponding to this fixing information are compared with each other. When these fixing information do not agree with each other, this card is set to a bad card and predetermined measures for this card are taken. In particular, magnetic data in the magnetic memory area 10 tend to be easily influenced by magnetism and there is a possibility that the magnetic data are easily erased, etc.

When the card 5 is judged as an effective card as a checking result, this card 5 functions as a prepaid card and a card amount adjustment is made so that the "card new balance" and the "rough estimate balance" are newly respectively written to the magnetic memory area 10 and the capacitive memory area 12.

Data are also written to the card 5 in addition to this adjustment. A second electrode 43 and a pair of first electrodes 42, 42 connected to this second electrode 43 are designated on the basis of a writing control signal from the capacitive reading processing section 51. A writing electric signal flows through these electrodes so that a designated fuse is melted and cut. When a circuit having the fuse 33 melted and cut is formed, bit data become "0". On the other hand, the bit data become "1" in a closed circuit having a fuse 33 unmelted and uncut. Thus, desirable binary data are written to the card.

Thereafter, at the time of moving the card 5 in return, the above read write driver 48 supplies writing data to the magnetic head 19 on the basis of a writing control signal from the magnetic reading processing section 52. New data are written to the magnetic memory area 10 and the card 5 is returned.

Thus, according to this embodiment, the magnetic memory area 10 is formed in the card 5 in addition to the capacitive memory area 12. Accordingly, required data are freely rewritten to this magnetic memory area 10 so that utility value of the card is high. Further, if predetermined data are stored in the capacitive memory area 12, data are not easily regenerated so that alteration of these data, etc. are prevented and reliability of the card is improved. When data read from the rough estimate remaining memory means 13 show the remaining amount "0" of compensation, the reader judges that the card is invalid irrespective of data stored in the magnetic memory area. Accordingly, it is precisely judged whether the card is valid or invalid. Therefore, the use of an unrighteous card, etc. are prevented.

Second Embodiment

Figure 6:
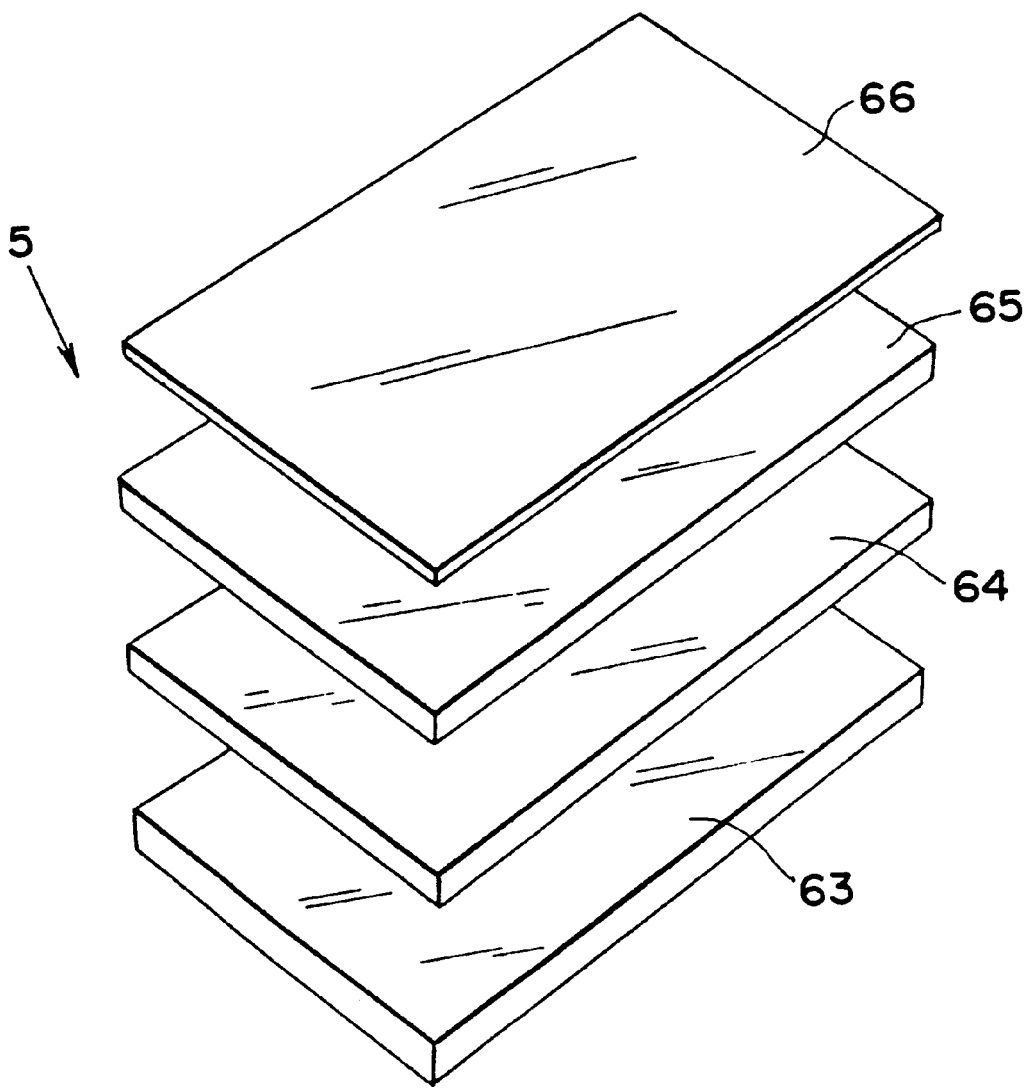
FIG. 6 is an exploded perspective view showing a capacitive data card in accordance with a second embodiment of the present invention.
Figure 7:
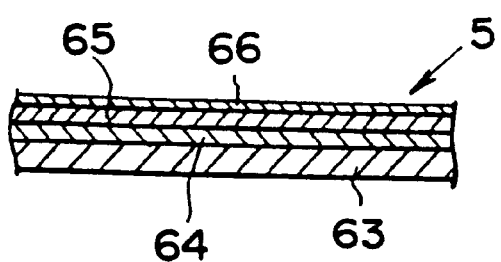
FIG. 7 is a longitudinal sectional view of the same capacitive data card.

A second embodiment of the present invention will next be explained. FIG. 6 is a perspective view showing a state in which a capacitive data card in this embodiment is exploded. FIG. 7 is a longitudinal sectional view of the capacitive data card.

The capacitive data card 5 in this embodiment has a capacitive memory area 65 relative to storage of capacitive data and a magnetic memory area 64 relative to storage of magnetic data. For example, this capacitive data card 5 is used as a prepaid card.

The above capacitive memory area 65 and the magnetic memory area 64 are constructed as shown in FIGS. 6 and 7. Namely, a layer constituting this magnetic memory area 64 is formed on the surface of a substrate 63 formed in the shape of a thin plate and manufactured by a synthetic resin material, etc. constituting the capacitive data card 5. A layer constituting the above capacitive memory area 65 is superposed on a surface of this layer constituting the magnetic memory area 64.

Figure 8:
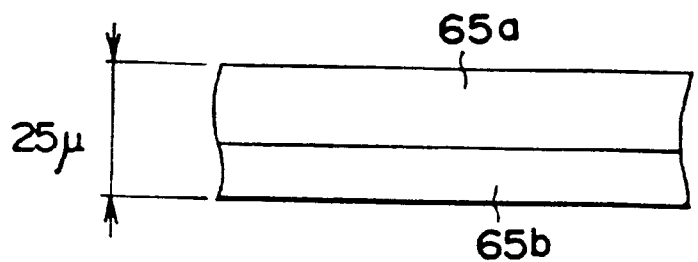
FIG. 8 is an enlarged longitudinal sectional view of a capacitive memory area of the same capacitive data card.

As shown in FIG. 8, this capacitive memory area 6a is constructed by superposing a polyethylene film layer 65b on the surface of a conductor evaporating layer 65a. A coating layer 66 is formed on a surface of the capacitive memory area 65 thus constructed.

The capacitive data card has a basic structure similar to that in the above first embodiment. For example, magnetic tracks are formed in the above magnetic memory area 64 in reading and writing directions of this card 5, and the above electrodes are arranged in the above capacitive memory area 65.

Further, similar to the above first embodiment, the above fixing and variable information are written to both the above memory areas 64 and 65.

Similar to the above first embodiment, a reading or writing operation of each of data stored in the capacitive data card 5 in this embodiment constructed as above is performed by inserting and mounting the card to a reader as shown in the first embodiment. In particular, the capacitive data card 5 in accordance with this embodiment is constructed by superposing the capacitive memory area 65 on the surface of the magnetic memory area 64 as mentioned above so that each of memory capacities of the magnetic memory area 64 and the capacitive memory area 65 can be increased.

In a modified example of this second embodiment, the capacitive memory area 65 is formed on the surface of the above substrate 63 and the magnetic memory area 64 is superposed on the surface of this capacitive memory area 65. A means for increasing an occupying area of each of the memory areas 64 and 65 by this superposing structure is also considered.

However, in the case of this modifying structure in the second embodiment, the magnetic memory area 64 exists on a surface side of the card. Therefore, when the card is inserted and mounted to the reader, read results show ON (1 among 1 and 0) among ON and OFF at any time. As this result, the card having such a structure can be permanently used so that such a card cannot be adopted as a prepaid card.

On the other hand, in the case of the structure in the above mentioned second embodiment, the above capacitive memory area 65 is interposed between the magnetic head 19 of the reader and the magnetic memory area 64. Accordingly, this reading head 19 and the magnetic memory area 64 are separated from each other in comparison with the case of the conventional structure. Therefore, a clearance size between the reading head 15 and a surface of the card 5 becomes important in an exact reading operation.

This clearance size is determined by performance of the reading head 15 and magnetic force of each of tracks constituting the magnetic memory area 64. Accordingly, at least one of a means for strengthening the above magnetic force, a means for improving performance of the reading head of the reader for performing reading and writing operations of the capacitive data card 5 in this second embodiment, and a means for holding the above clearance size as small as possible, etc. is adopted to exactly perform the reading and writing operations. However, such means are constructed by techniques which can be determined in design. Accordingly, no special explanation of such means is required here.

Third Embodiment

Figure 9:
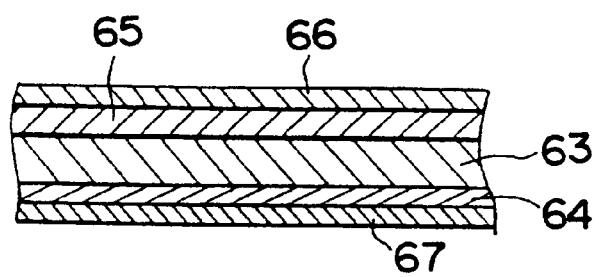
FIG. 9 is an enlarged longitudinal sectional view of a capacitive data card in accordance with a third embodiment of the present invention.

FIG. 9 shows a third embodiment of the present invention. A capacitive data card 5 in accordance with this embodiment is constructed as follows. Naiely, a layer constituting the above capacitive memory area 65 is formed on one side of a substrate 63 formed in the shape of a thin plate and manufactured by a synthetic resin material, etc. A coating layer 66 is superposed on a surface of the capacitive memory area 65. A layer constituting the above magnetic memory area 64 is formed on the other side of the above substrate 63. A printing layer 67 is superposed on a surface of this layer constituting this magnetic memory area 64. Constructions of the substrate 63 the magnetic memory area 64 and the capacitive memory area 65 in this embodiment are similar to those of the capacitive data card 5 in accordance with the above second embodiment.

Since the capacitive data card 5 in this embodiment is constructed as above, the clearance size between the above magnetic memory area 64 and a magnetic head can be set to be smaller than that in the capacitive data card 5 in the second embodiment so that a magnetic head similar to the conventional magnetic head can be used. As this result, the construction of the reader can be simplified so that system cost can be reduced. Further, the card can be easily manufactured since the above layers constituting the magnetic memory area 64 and the capacitive memory area 65 can be formed on front and rear faces of the substrate 63.

Fourth Embodiment

Figure 10:
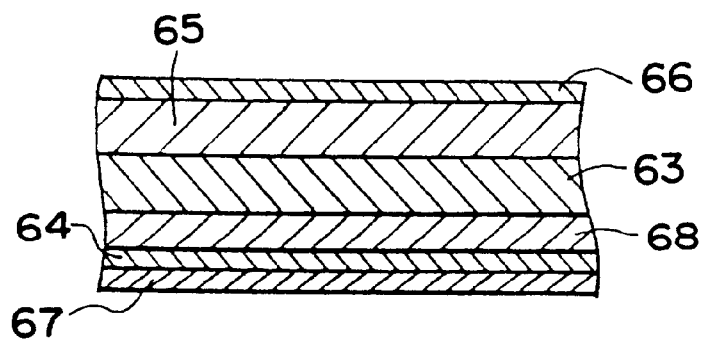
FIG. 10 is an enlarged longitudinal sectional view of a capacitive data card in accordance with a fourth embodiment of the present invention.

FIG. 10 shows a fourth embodiment of the present invention. A capacitive data card 5 in accordance with this embodiment is constructed as follows. Namely, a layer constituting the above capacitive memory area 65 is formed on one side of a substrate 63 formed in the shape of a thin plate and manufactured by a synthetic resin material, etc. A coating layer 66 is superposed on a surface of the capacitive memory area 65. A layer constituting the above magnetic memory area 64 is formed on the other side of the above substrate 63. A polyethylene film layer 68 formed in the shape of a thin film is superposed on a surface of the layer constituting this magnetic memory area 64. A printing layer 67 is superposed on a surface of the polyethylene film layer 68. The constructions of the substrate 63, the magnetic memory area 64 and the capacitive memory area 65 in this embodiment are similar to those of the capacitive data card 5 in the above second embodiment.

Since the capacitive data card 5 in this embodiment is constructed as above, warp of the substrate 63 can be also prevented effectively in addition to operations and effects obtained by the capacitive data card 5 in the above second embodiment.

Fifth Embodiment

Figure 11:
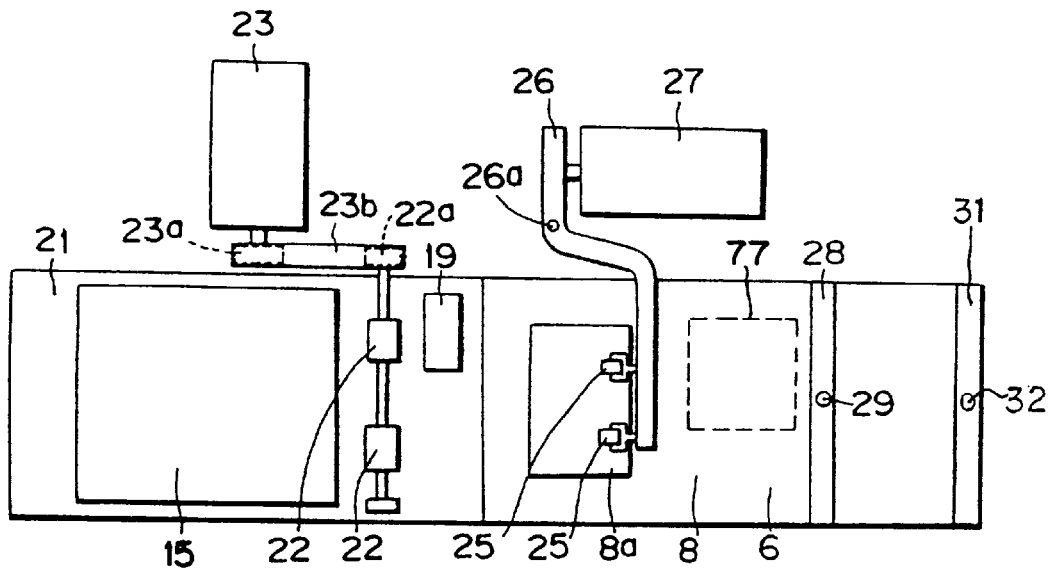
FIG. 11 is a view showing the mechanism of a card reader in accordance with a fifth embodiment of the present invention.
Figure 12:
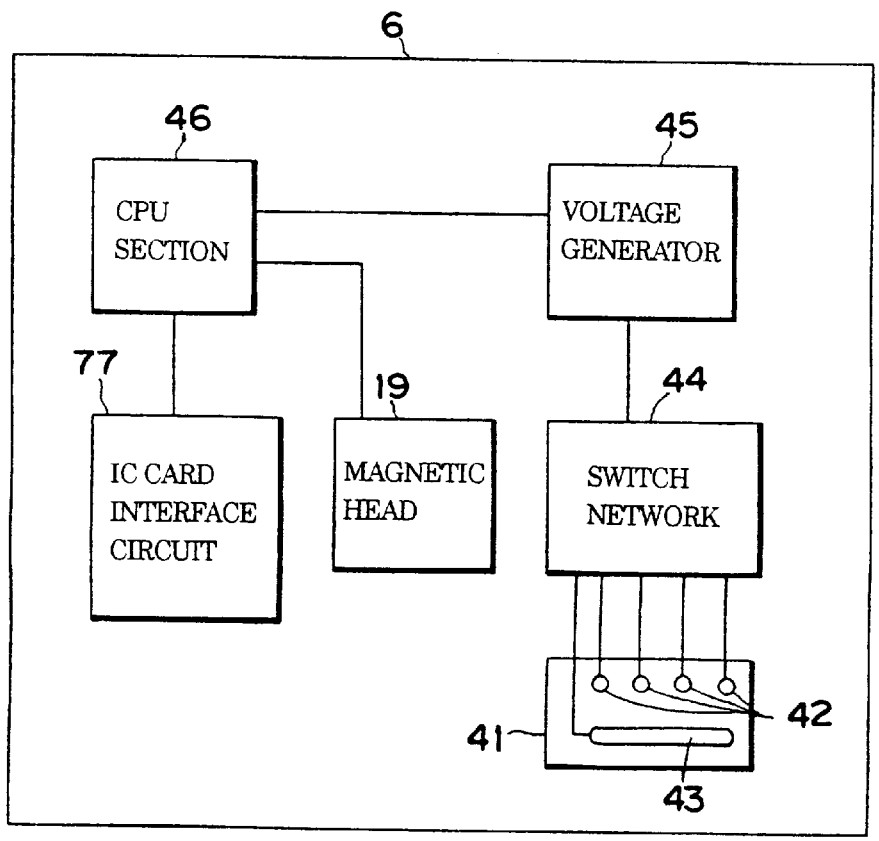
FIG. 12 is a block diagram showing an input output section of the same card reader.
Figure 13:
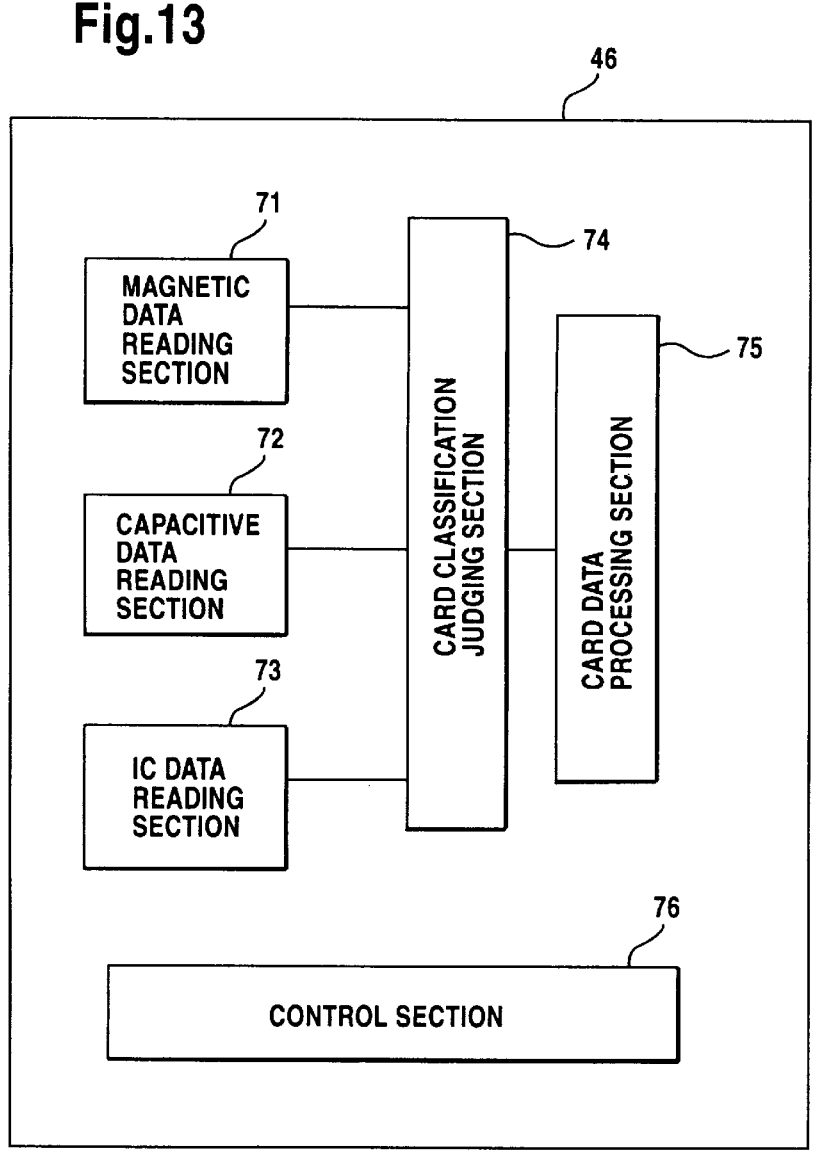
FIG. 13 is a block diagram showing processing of a CPU section of the same card reader.
Figure 14:
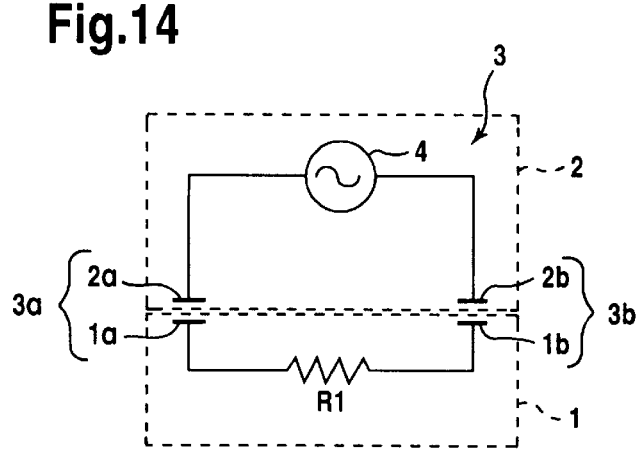
FIG. 14 is a conceptual explanatory view schematically showing a basic capacitive data card system.

FIGS. 11 to 13 show a card reader in accordance with a fifth embodiment of the present invention. As shown in FIG. 12, similar to the card reader described in the first embodiment, this card reader has a CPU (microcomputer) section 46 for controlling an operation of the entire card reader. This CPU section 46 is connected to a voltage generator 45, a magnetic head 19 and an IC card interface 77 in addition to the above first electrodes 42, the second electrode 43 and the switch network 44. The voltage generator 45 supplies a required voltage to each of the first electrodes 42 or the second electrode 43 through the switch network 44, and detects an output voltage. The IC card interface 77 electrically operates an integrated circuit of an IC card. These elements are operated on the basis of commands from the CPU section 46.

As shown in FIG. 13, the above CPU section 46 has a capacitive data reading section 72a magnetic data reading section 71 and an IC data reading section 73. The capacitive data reading section 72 judges whether reading and writing processings and a reading operation of capacitive data are normal or not. The magnetic data reading section 71 judges whether reading and writing processings and a reading operation of magnetic data are normal or not. The IC data reading section 73 judges whether reading and writing processings and a reading operation of the IC card are normal or not.

Further, the CPU section 46 has a card classification judging section 74, a card data processing section 75 and a control section 76. The card classification judging section 74 judges a classification of the card 5 inserted into the reader on the basis of the read results of card data in each of the above reading sections 71, 72 and 73. The card data processing section 75 performs predetermined processing on the basis of the read card data. The control section 76 generally controls an operation of each of the above sections. The constructions of the respective reading sections 71, 72, the card classification judging section 74, the card data processing section 75 and the control section 76 in the CPU section 46 in this embodiment are similar to the constructions of the capacitive reading processing section 51, the magnetic reading processing section 52, the data checking section 53 and the control section 54 in the CPU 46 constituting the card reader in the first embodiment. Accordingly, a detailed explanation of the constructions and operations of these sections is omitted here.

This embodiment differs from the first embodiment as follows. Namely, when the above card classification judging section 74 judges that card includes none of the magnetic data and the capacitive data, or judges that the card includes only the magnetic data, there is a possibility that the inserted card 5 is an IC card. Therefore, a reading operation of the IC card is subsequently performed. It is expected that a card including all of the magnetic data, the capacitive data and the IC card data, or a card including two kinds of data among these data is issued. Accordingly, for example, if a predetermined mode is set in the card reader in such a case, the reading operation of all the data can be executed.

In the reading operation of the IC card data, the card 5 is further moved by rollers (not shown in the drawings) and the reader and the above said edging sensor 28 or an edging sensor 31 installed separately and the above said optical sensor 29 or an optical sensor 32 installed separately detect that the card 5 reaches an end edge portion of the input output section 6. In this position, the reader an a terminal formed in the card 5 are electrically connected to each other by the IC card interface 77.

The IC card interface then provides Address information, etc. to the card 5 and reads data from a memory on the basis of commands from the IC data reading section 73. Further, the IC data reading section 73 judges whether read results of these data are right or wrong, and also analyzes these data. The card classification judging section 74 judges on the basis of the right wrong information of these read results whether or not the inserted card 5 includes the IC card data. When it is judged that the card 5 includes the IC card data, the card data processing section 75 performs data processing with respect to the IC card. The other processings are similar to those of the card reader in the first embodiment. Accordingly, a detailed explanation of these processings is omitted here.

Industrial Utilization Possibility

As explained above, a capacitive data card in accordance with the present invention comprises a capacitive memory area and a magnetic memory area. Accordingly, required data are freely rewritten so that the capacitive data card is of high utility value. Further, since predetermined data are not easily regenerated, alteration of data, etc. are prevented so that reliability of the capacitive data card is improved. If this capacitive data card is used as a prepaid card, etc. utility value of the card is high.

Furthermore, a rough estimate remaining memory means showing a rough estimate of the remaining amount of compensation recorded on the card by a bit amount is provided in the capacitive memory area. Accordingly required data are freely rewritten in cooperation with the magnetic memory area. Further, the remaining amount of the card compensation can be displayed by a small bit number. Furthermore, since these remaining data are not easily regenerated, reliability of the card is improved.

Further, the capacitive data card of the present invention can increase a memory capacity of each of the capacitive memory area and the magnetic memory area. Accordingly, this capacitive data card can be also utilized in a field requiring a larger amount of information in addition to the effects of prevention of the alteration of data included in the conventional capacitive data card, etc.

In addition, the capacitive data card is also used as an IC card. For example, the capacitive memory area can be also utilized as a security area for preventing alteration of the IC card.

A capacitive data card reader of the present invention can also judge that the card is invalid irrespective of data stored in the magnetic memory area when data read from a rough estimate remaining memory means are predetermined data. Accordingly, it is precisely judged that the card is valid and invalid. Therefore, the use of an unrighteous card, etc. can be prevented. further, the capacitive data card reader has the advantage in that it is not necessary to respectively use the reader corresponding to the type of the IC card with the result that a complicated operation is no more required.

What is claimed is:

1. A capacitive data card comprising:

a magnetic memory area for storing first data; and a capacitive memory area for irreversibly storing second data by a bit amount representative of a rough estimate of the remaining amount of said first data, wherein said second data are changed by an amount larger than a minimal amount of change of said first data, and said second data are greater than said first data, or equal to said first data when the capacitive memory area is rewritten, and wherein said minimal amount corresponds to an amount of adjustment of said first data.

2. A capacitive data card according to claim 1, wherein a layer constituting a magnetic memory area is formed on a surface of a substrate having the shape of a thin plate, and a layer constituting said capacitive memory area is superposed on a surface of the layer constituting said magnetic memory area.

3. A capacitive data card according to claim 1, wherein a layer constituting said capacitive memory area is formed on one side of a substrate having the shape of a thin plate, and a layer constituting said magnetic memory area is formed on the other side of said substrate.

4. A capacitive data card according to claim 1, wherein coating layers are superposed on a surface of a layer constituting said capacitive memory area and a surface of said magnetic memory area respectively.

5. A capacitive data card comprising:

an IC memory for storing first data; and a capacitive memory area for irreversibly storing second data by a bit amount representative of a rough estimate of the remaining amount of said first data, wherein said second data are changed by an amount larger than a minimal amount of change of said first data, and said second data are greater than said first data, or equal to said first data when the capacitive memory area is rewritten, and wherein said minimal amount corresponds to an amount of adjustment of said first data.

6. A capacitive data card comprising:

one of a magnetic memory area and an IC memory for storing first data; and a capacitive memory area for irreversibly storing second data by a bit amount representative of a rough estimate of the remaining amount of said first data, wherein said second data are changed by an amount larger than a minimal amount of change of said first data, and said second data are greater than said first data, or equal to said first data when the capacitive memory area is rewritten, and wherein said minimal amount corresponds to an amount of adjustment of said first data.

7. A capacitive data card reader according to claim 6, further comprising:

a first input output means for storing data in the capacitive memory area of the capacitive data card and/or reading the data stored therein;

a second input output means for storing data in said magnetic memory area and/or reading the data stored therein; and checking means for judging that the capacitive data card is invalid irrespective of the data stored in one of said magnetic memory area and said IC memory when said second data read from said capacitive memory area is smaller than said first data read from the one of said magnetic memory area and said IC memory.

* * * * *